United States Patent [19]

Naegeli

[11] 3,876,561
[45] Apr. 8, 1975

[54] NOVEL ODORANT CYCLODODECYL ETHERS

[75] Inventor: Peter Naegeli, Unter-Ehrendingen, Switzerland

[73] Assignee: Givauden Corporation, Clifton, N.J.

[22] Filed: Mar. 1, 1974

[21] Appl. No.: 447,401

Related U.S. Application Data

[62] Division of Ser. No. 194,570, Nov. 1, 1971, Pat. No. 3,845,141.

[30] Foreign Application Priority Data

Nov. 3, 1970   Switzerland....................... 16263/70

[52] U.S. Cl............................. 252/522; 260/611 R

[51] Int. Cl............................................. C11b 9/00
[58] Field of Search......................... 252/522, 611 R

[56] References Cited
UNITED STATES PATENTS

| | | | |
|---|---|---|---|
| 3,754,039 | 8/1973 | Naegeli | 252/522 |
| 3,801,600 | 4/1974 | Naegeli | 252/522 |

*Primary Examiner*—Veronica O'Keef
*Attorney, Agent, or Firm*—Thomas Cifelli, Jr.

[57] ABSTRACT

Novel alkyl or alkenyl ring substituted cyclododecyl alkyl ethers are disclosed which possess wood to amberlike fragrances which are desirable in perfumery.

1 Claim, No Drawings

NOVEL ODORANT CYCLODODECYL ETHERS

RELATED APPLICATION

This is a division of application Ser. No. 194,570 filed Nov. 1, 1971, now U.S. Pat. No. 3,845,141 issued Oct. 29, 1974.

This application claims priority from applicant's Swiss Patent application No. 16,263, filed November 3, 1970.

SUMMARY OF THE INVENTION

The cyclododecyl ethers provided by the present invention have the following general formula

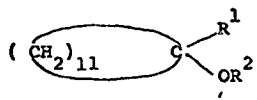 (I)

wherein
R$^1$ represents a C$_1$–C$_3$ alkyl group or a C$_2$–C$_3$ alkenyl group and
R$^2$ represents a methyl or ethyl group.

The cyclododecyl ethers of formula I are manufactured in accordance with the process provided by this invention by reacting an alcohol of the general formula

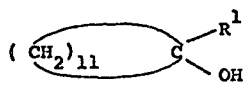 (II)

wherein R$^1$ has the significance given earlier, with a methylating or ethylating agent and, if desired, hydrogenating a compound of formula I obtained in which R$^1$ represents an alkenyl group such as vinyl, propenyl, isopropenyl and the like.

The cyclododecyl ethers of formula I are distinguished by particular fragrance properties (woody, e.g. cedar-like, to amber-like, tobacco-like) on the basis of which they can be used for perfumery purposes such as for the manufacture of perfumes or for perfuming products of all kinds such as cosmetic products.

DESCRIPTION OF THE PREFERRED EMBODIMENTS

The compounds of the present invention may be prepared by methylation or ethylation of alcohols of Formula II by methods which are well known in the art (see, for example, Houben-Weyl, Methoden der organischen Chemie 6/2, pages 5 ff, Georg Thieme Verlag Stuttgart 1965).

Expediently, the reaction is carried out by converting an alcohol of formula II into an alkali metal salt and reacting this salt with a methyl or ethyl halide or with dimethyl or diethyl sulphate.

Examples of suitable alkali metal salts of alcohols of formula II are the lithium, sodium or potassium salts. The sodium and the potassium salt are preferred.

Examples of methyl or ethyl halides are the chlorides, bromides or iodides. The iodides and bromides are preferred.

The conversion of an alcohol of formula II into an alkali metal salt can be carried out in a manner known per se; for example, by reaction with a strong base such as an alkali metal (e.g. sodium), an alkali metal hydride (e.g. sodium hydride) or an alkali metal amide (e.g. sodium amide).

The reaction of an alkali metal salt thus obtained with a methylating or ethylating agent is preferably carried out in an aprotic organic solvent. Examples of such solvents are hydrocarbons such as benzene or toluene and ethers such as dioxan or tetrahydrofuran. This reaction is expediently carried out at an elevated temperature; for example, at above about room temperature, preferably at a temperature between about 70° and 140°C.

The optional hydrogenation of a cyclododecyl ether of formula I in which R$^2$ represents an alkenyl group to give a cyclododecyl ether of formula I in which R$^2$ represents an alkyl group can be carried out catalytically in the usual manner. As the catalyst there can be used, for example, Raney-nickel or platinum, but preferably palladium-on-charcoal.

The alcohol starting materials of formula II, insofar as they are not known, can be prepared from cyclododecanone according to the generally known methods for the preparation of tertiary alcohols from ketones.

The novel compounds of the present invention possess particularly desirable odorant properties which are useful in perfumery. The compounds may be used to produce perfume bases which in turn may be utilized in formulating perfumes or in providing odorant characteristics for cosmetic products such as soaps, powders, creams, lotions and the like. The content of cyclododecyl ethers of formula I in odorant compositions is governed by the intended use of such compositions and can vary within wide limits, for example between about 0.005–30 wt.%. Preferably, odorant compositions contain between about 0.05–20 wt.% of a cyclododecyl ether of formula I.

1-Methylcyclododecyl methyl ether and 1-methylcyclododecyl ethyl ether are characterized by a particularly interesting perfume-note (powerful woody/amber-like, warm, and woody-amberous with very good adhesion).

The following Examples illustrate the process provided by the present invention.

EXAMPLE 1

A mixture of 100 g of 1-methylcyclododecanol and 19.2 g of sodium hydride in 1 litre of absolute benzene is held under reflux for 16 hours. 76.4 ml (100.8g) of dimethyl sulphate are then added dropwise at 20°C, whereupon the mixture is again held under reflux. The mixture is poured into water, exhaustively extracted with benzene, the benzene layer washed neutral, dried and evaporated. The oily crude product obtained is fractionated in a high vacuum at 90°C and 0.15 mm Hg. 100 g of pure 1-methylcyclododecyl methyl ether are obtained.

IR spectrum (film): 1372, 1122, 1100, 1090, 1070, 865, 805, 730 cm$^{-1}$. NMR spectrum (CDCl$_3$+TMS): singlet (3H) at δ = 3.20 ppm; singlet (3H) at δ = 1.08 ppm. Mass spectrum: m/e = 212, 197, 85, 72.

EXAMPLE 2

A mixture of 1.92 g of sodium hydride and 10g of 1-methylcyclododecanol is held under reflux in 100 ml of absolute benzene for 20 hours. 10.4 ml of diethyl sulphate are then added dropwise at 20°–25°C and the reaction mixture is again held under reflux for 3 hours. The mixture is poured into ice-water, extracted with benzene, the benzene layer washed, dried and evaporated to yield 10.2 g of crude product which, after distillation in a high vacuum, yields 7 g of pure 1-methylcyclododecyl ethyl ether. Boiling point 80°C/0.05 mm Hg.

IR spectrum (film): 1390, 1375, 1280, 1260, 1225, 1170, 1130, 1100, 1090, 1070, 950 cm$^{-1}$. NMR spectrum (CDCl$_3$+TMS): quadruplet (2H) at $\delta$ = 3.40 ppm; triplet (3H) at $\delta$ = 1.10 ppm; singlet (3H) at $\delta$ = 1.10ppm. Mass spectrum: m/e = 226, 211, 99, 86, 71, etc.

EXAMPLE 3

A mixture of 21 g of 1-vinylcyclododecanol and 3.85 g of sodium hydride is held under reflux in 200 ml of absolute benzene for 18 hours. It is then treated at 20°C with 20.2 g of dimethyl sulphate and the reaction mash obtained is diluted with 50 ml of benzene. After heating under reflux for a further 4 hours, the reaction mixture is decomposed with 20% citric acid at 10°C and the mixture is exhaustively extracted with benzene. After washing out the organic phase with water and drying, the benzene is evaporated off. The resulting 22.9 g of oily product are fractionated in a high vacuum. At 76°C and 0.001 mm Hg, there are obtained 20.1 g of pure 1-vinylcyclododecyl methyl ether.

IR spectrum (film): 1640, 1415, 1350, 1255, 1120, 1095, 1082, 1075, 1008, 925, 872, 755, 730 cm$^{-1}$. NMR spectrum (CDCl$_3$+TMS): type ABC resolution (3H) between $\delta$ = 6.0 and 4.90 ppm; singlet (3H) at $\delta$ = 3.14 ppm. Mass spectrum: m/e = 224, 209, 197, 192, 183, 177, 163, 149, 135, etc.

EXAMPLE 4

5.6 g of 1-vinylcyclododecyl methyl ether are hydrogenated in 100 ml of ethanol at normal pressure and room temperature with the addition of 0.5 g of 10% palladium-on-charcoal. After completion of the hydrogen uptake, the catalyst is filtered off, the solvent evaporated and the crude product distilled in a bulb-tube at 72°C/0.01 mm Hg.

The resulting 5.4 g of distillate represent pure 1-ethylcyclododecyl methyl ether:

IR spectrum (film): 1120, 1100, 1080, 1075, 870/730 cm$^{-1}$. NMR spectrum (CDCl$_3$+TMS): singlet (3H) at $\delta$ = 3.13 ppm; multiplet (3H) between $\delta$ = 0.6 and 0.59 ppm. Mass spectrum m/e = 226, 197, 99, 86, etc.

EXAMPLE 5

10.5 g of 1-vinylcyclododecanol in 100 ml of dry benzene and 1.92 g of sodium hydride are heated under reflux for 20 hours. 12.3 g of diethyl sulphate are then added to the reaction mixture at room temperature and the mixture is heated at reflux for 4 hours. The mixture is then treated with 20% citric acid at 10°C, extracted with benzene, the benzene extract washed neutral and evaporated to give 12 g of a wax-like mass. After distillation at 92°C/0.02 mm Hg, there are obtained 10.6 g of pure 1-vinylcyclododecyl ethyl ether of melting point 35.5°–36.5°C.

IR spectrum (Nujol): 1642, 1415, 1385, 1280, 1255, 1225, 1160, 1125, 1108, 1075, 1005, 925 cm$^{-1}$. NMR spectrum (CDCl$_3$+TMS): ABC resolution (3H) between $\delta$ = 4.85 and 6.0 ppm; quadruplet (2H) at $\delta$ = 3.30 ppm; triplet (3H) at $\delta$ = 1.12 ppm. Mass spectrum: m/e = 238, 223, 211, 195, 167, 155, 153, 139, 125, 111, etc.

EXAMPLE 6

A mixture of 8.5 g of 1-ethylcyclododecanol and 1.15 g of sodium hydride is heated under reflux for 7 hours in 100 ml of dry benzene. 7.4 g of diethyl sulphate are then added at 0°C and the mixture is held at reflux for 12 hours. The mixture is then treated, with cooling, with 20% citric acid and exhaustively extracted with benzene. After washing neutral and drying the organic phase is evaporated. There are obtained 9 g of an oily product which is chromatographed on silica gel. The pure 1-ethylcyclododecyl ethyl ether thus obtained has a boiling point of 70°C/0.001 mm Hg and a melting point of 28°–29°C.

IR spectrum (film): 1170, 1125, 1105, 1090, 1070, 990, 975, 955 cm$^{-1}$. NMR spectrum (CDCl$_3$+TMS): quadruplet (2H) at $\delta$ = 3.31 ppm; triplet (3H) at $\delta$ = 1.16 ppm; irregular triplet $\delta$ = 0.81 ppm; mass spectrum: m/e = 240, 211, 113, 100, etc.

EXAMPLE 7

A mixture of 11.2 g of 1-isopropenylcyclododecanol and 1.93 g of sodium hydride is heated under reflux for 20 hours in 120 ml of dry benzene. 7.65 ml of dimethyl sulphate are then added at 20°C and the mixture obtained is heated under reflux for 6 hours. The mixture is treated with 20% citric acid at 10°C and exhaustively extracted with benzene. The benzene extract is washed neutral, dried and evaporated to yield 11.6 g of crude product. Distillation of this crude product at 90°C/0.05 mm Hg yields 10.8 g of pure 1-isopropenyl-cyclododecyl methyl ether of melting point 30°–31°C.

IR spectrum (film): 1642, 1375, 1350, 1242, 1110, 1080, 1058, 904, 860, 755, 730 cm$^{-1}$. NMR spectrum (CDCl$_3$+TMS): narrow multiplets (each 1H) at $\delta$ = 5.05 and $\delta$ = 4.86 ppm; singlet (3H) at $\delta$ = 3.05 ppm; narrow double doublet (3H) at $\delta$ = 1.73 ppm. Mass spectrum: m/e = 238, 197, 111 etc.

EXAMPLE 8

2.4 g of 1-isopropenylcyclododecyl methyl ether are hydrogenated at normal pressure and room temperature in 50 ml of ethanol in the presence of 0.2 g of 10% palladium-on-charcoal and a spatula-tip of calcium carbonate. After completion of the hydrogen uptake, the mixture is filtered from the catalyst, the filtrate is evaporated and the crude product is freed from byproduct (isopropylcyclododecane) by chromatography on silica gel. The pure 1-isopropylcyclododecyl methyl ether (2 g) is distilled in a bulb-tube. Boiling point 65°C/0.08 mm Hg.

IR spectrum (film): 1386, 1366, 1348, 1085, 850, 750, 735 cm$^{-1}$. NMR spectrum (CDCl$_3$+TMS): singlet (3H) at $\delta$ = 3.15 ppm; doublet (6H) at $\delta$ = 0.92 ppm. Mass spectrum: m/e = 240, 197, 113, etc.

The following Examples illustrate odorant compositions containing the cyclododecyl ethers provided by the invention:

EXAMPLE A

Composition with wood-note

| | Parts by weight |
|---|---|
| Coumarin | 20 |
| Musk ketone | 20 |
| Heliotropin | 30 |
| Phenylethyl alcohol | 100 |
| Geraniol pure | 50 |
| Rhodinol | 100 |
| Vetiver oil bourbon | 30 |
| Peru balsam | 70 |
| Patchouli oil | 30 |
| Cedryl acetate crystalline | 100 |
| Sandalwood oil East Indian | 80 |
| Oak-moss resinoid Yugoslavian | 20 |
| α-Amylcinnamaldehyde | 50 |
| Rose de mai artificial | 40 |
| Linalyl acetate | 30 |
| Bergamott Oil Reggio | 80 |
| Phthalic acid diethyl ester | 50 |
| | 900 |

By the addition of 100 parts by weight 1-vinylcyclododecyl methyl ether to the foregoing carrier composition, the woody note thereof is strengthened and the diffusion increased.

EXAMPLE B

Composition with woody/amber-like note.

| | Parts by weight |
|---|---|
| Calamus oil | 5 |
| Patchouli oil | 5 |
| Coumarin | 10 |
| Heliotropin | 10 |
| Vanillin 10%* | 20 |
| Methylnonylacetaldehyde 1%* | 20 |
| Jasmin absolue de chassis | 15 |
| Rose oil synthetic | 30 |
| Labdanum oil | 40 |
| Bergamott oil Reggio | 15 |
| Celeriac oil 10%* | 10 |
| | 180 |

*in phthalic acid diethyl ether

By the addition of 50 parts by weight of 1-methylcyclododecyl methyl ether to the foregoing carrier composition, the woody character of the composition is strengthened and the diffusion increased.

I claim:

1. An odorant composition comprising a carrier composition and an olfactible amount of 1-methylcyclododecyl methyl ether.

* * * * *